United States Patent [19]

Kanou et al.

[11] 4,381,551

[45] Apr. 26, 1983

[54] ELECTRONIC TRANSLATOR

[75] Inventors: Ikuo Kanou, Yamatokoriyama; Shigenobu Yanagiuchi, Tenri; Takuro Omori, Yamatokoriyama, all of Japan

[73] Assignee: Sharp Kabushiki Kaisha, Osaka, Japan

[21] Appl. No.: 186,323

[22] Filed: Sep. 11, 1980

[30] Foreign Application Priority Data

Sep. 13, 1979 [JP] Japan .............................. 54-118146
Sep. 13, 1979 [JP] Japan .............................. 54-118149

[51] Int. Cl.³ ........................................... G06F 15/38
[52] U.S. Cl. .................................................. 364/900
[58] Field of Search ................. 364/900 MS File, 419

[56] References Cited

U.S. PATENT DOCUMENTS 3,564,508  2/1971  Loewenthal et al. ............... 364/900
4,290,115  9/1981  Pitt et al. .......................... 364/900

*Primary Examiner*—Raulfe B. Zache
*Attorney, Agent, or Firm*—Birch, Stewart, Kolasch and Birch

[57] ABSTRACT

An electronic translator is characterized in that similarity detection circuit is provided for detecting similarity between letters within a first word and those within a second word in the same language as the first word, with the object of locating a second word stored in memory having letters which are similar to the letters of the first word. In another form of the present invention, the first word is entered containing at least one Arabic numeral to obtain a translated word in a different language. For this purpose, the memory has a plurality of translated words containing the at least one Arabic numeral.

6 Claims, 10 Drawing Figures

EVENT N · テ″キコ″ト
EVER AD · イママテ″
EVERY A · アラユル
EVERYBODY PRON · ダ″レテ″モ
EVERYONE PRON · ダ″レテ″モ

| | |
|---|---|
| a1 | アイテ |
| a2 | アイマイナ |
| ⋮ | ⋮ |
| | ワタシ |
| | ワレル |
| | 0 (レイ) |
| | 1 |
| aℓ | 1カイ |
| | 1ガツ |
| | 1ガッキ |
| | 5バンメ |
| | 10ガツ |
| | |
| am-1 | 90 |
| am | 90ノ |

FIG. 7

| | |
|---|---|
| b1 | able |
| b2 | about |
| b3 | above |
| ⋮ | ⋮ |
| bp | sail |
| ⋮ | ⋮ |
| | zone |
| bn1 | zoo |
| bn | zoom |

FIG. 8

|   | head address |   | head address |
|---|---|---|---|
| ア | 0 0 1 0 0 0 0 0 | A | 1 0 1 0 0 0 0 0 |
| イ | 0 0 1 0 0 1 0 1 | B | 1 0 1 1 0 0 1 1 |
| ウ | 0 0 1 0 1 1 0 0 | C | 1 0 1 1 1 1 0 1 |
| ¦ | ¦ | ¦ | ¦ |
| ¦ | ¦ | ¦ | ¦ |
| ¦ | ¦ | ¦ | ¦ |
| ¦ | ¦ | Z | 1 1 1 0 0 1 0 0 |
| ¦ | ¦ |   |   |
| ワ | 0 1 0 1 1 0 1 0 |   |   |
| 0 | 0 1 0 1 1 1 0 1 |   |   |
| 1 | 0 1 1 0 0 1 0 0 |   |   |
| 2 | 0 1 1 0 1 1 0 0 |   |   |
| 4 | 0 1 1 1 0 1 1 1 |   |   |
| ¦ | ¦ |   |   |
| ¦ | ¦ |   |   |
| ¦ | ¦ |   |   |
| 9 | 1 0 0 0 0 1 0 1 |   |   |

FIG. 9

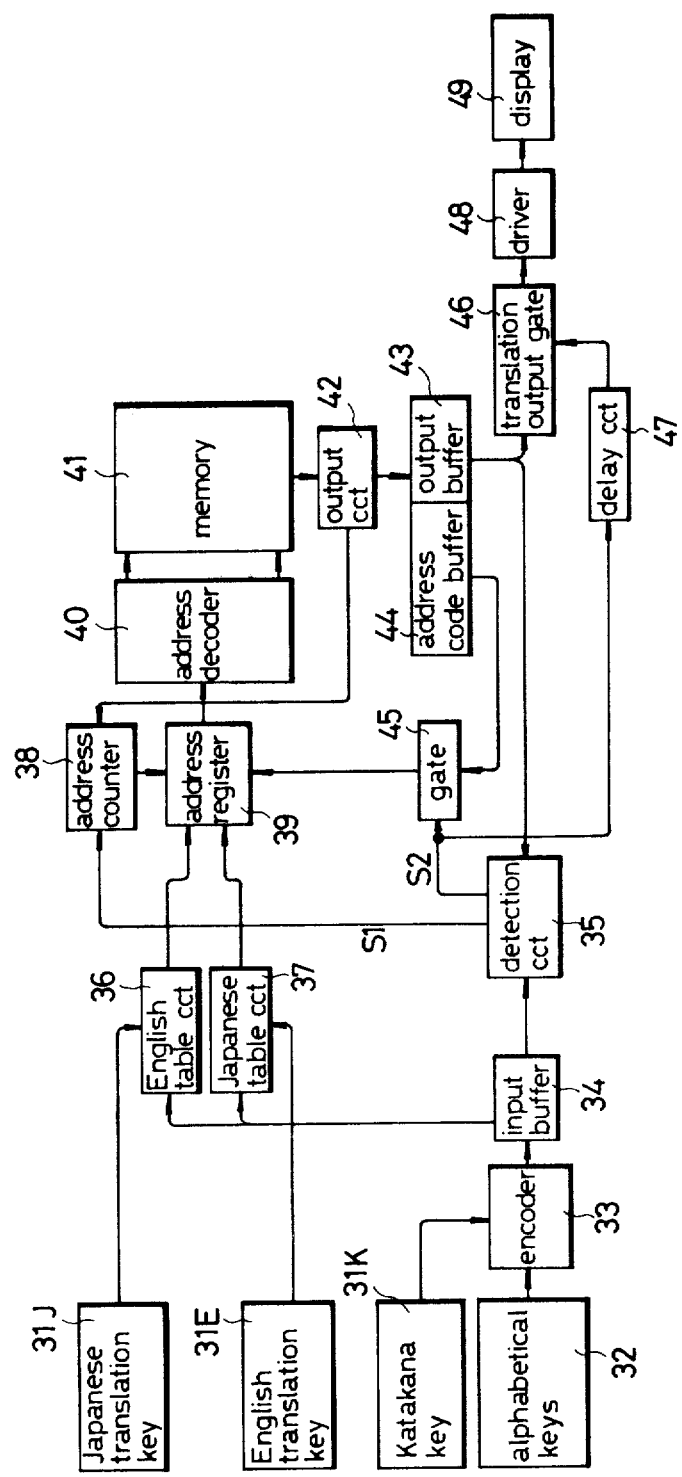
F I G. 10

ELECTRONIC TRANSLATOR

BACKGROUND OF THE INVENTION

The present invention relates in general to a word information storage and retrieval device and, more particularly, to an electronic translator for providing efficient and rapid retrieval of any desired word or words stored therein.

In recent years, so-called "electronic translator" devices have gained in popularity and have met with commercial success. These electronic-translators typically include a first memory for storing a plurality of translated words one of which is addressed in response to the introduction of a word by means of a keyboard device. For this purpose, a plurality of words, inclusive of the word to be entered, are also stored in a second memory, having a relation with the plurality of translated words. A sentence may be stored and addressed by similar techniques.

An example of such electronic translators was disclosed in Kehoe et al., U.S. Pat. No. 4,159,536, June 26, 1979, "PORTABLE ELECTRONICS LANGUAGE TRANSLATION DEVICE."

Another example of such electronic translators was disclosed in Levy U.S. Pat. No. 4,158,236, June 12, 1979, "ELECTRONIC DICTIONARY AND LANGUAGE INTERPRETER." In this patent, a means was disclosed which displayed words which were stored in an ROM which match letters entered by the user.

The letters entered formed a complete word if the user was sure of the word or, a partial word and a blank character entered for letters which the user was not sure of.

All words stored in the second memory, which had letters which matched the letters entered by the user, will be examined.

In connection with the introduction of the complete word or sentence, however, it is further desirous that a means be added for informing that the complete word or sentence cannot be found in the second memory and for displaying a word or a sentence similar to the word or the sentence entered, as much as possible, of the words stored in the second memory.

SUMMARY OF THE INVENTION

Accordingly, it is an object of the present invention to provide an improved electronic translator.

It is another object of the present invention to provide an improved electronic translator for informing that a complete word or sentence, accurately corresponding to a word or a sentence entered, cannot be found in a memory.

It is a further object of the present invention to provide an improved electronic translator for outputting a complete word or a sentence corresponding to a word or a sentence entered.

It is a further object of the present invention to provide an improved electronic translator for displaying a specific symbol representing that a complete word or a sentence which accurately corresponds to a word or a sentence entered, cannot be found in a memory.

It is a further object of the present invention to provide an improved electronic translator for entering a word having at least one Arabic numeral by using the Arabic numeral.

Other objects and further scope of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the detailed description.

To achieve the above objects, pursuant to an embodiment of the present invention, an electronic translator is characterized in that a similarity detection circuit is provided for detecting similarity between letters within a first word and those within a second word in the same language as the first word, with the object of locating a second word in a memory having letters which are similar to the letters of the first word. In another form of the present invention, the first word is entered containing at least one Arabic numeral to obtain a translated word in a different language.

For this purpose, the memory has a plurality of translated words containing the at least one Arabic numeral, rather than in the different language.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 7 and 8 are parts of the contents within a memory of a circuit incorporated in the electronic translator of FIG. 6;

FIG. 9 shows a part of head addresses used for a retrieval table; and

FIG. 10 shows a block diagram of the circuit incorporated within the electronic translator of FIG. 6.

DESCRIPTION OF THE INVENTION

First of all, any kind of language can be applied to an electronic translator of the present invention. An input "source" word is spelled in a specific language to obtain an equivalent word, or a translated word spelled in a different language corresponding thereto. The languages can be freely selected. According to an example of the present invention, it is assumed that the "source" language is English and the translated language is Japanese, and vice versa.

Figures 1, 3:
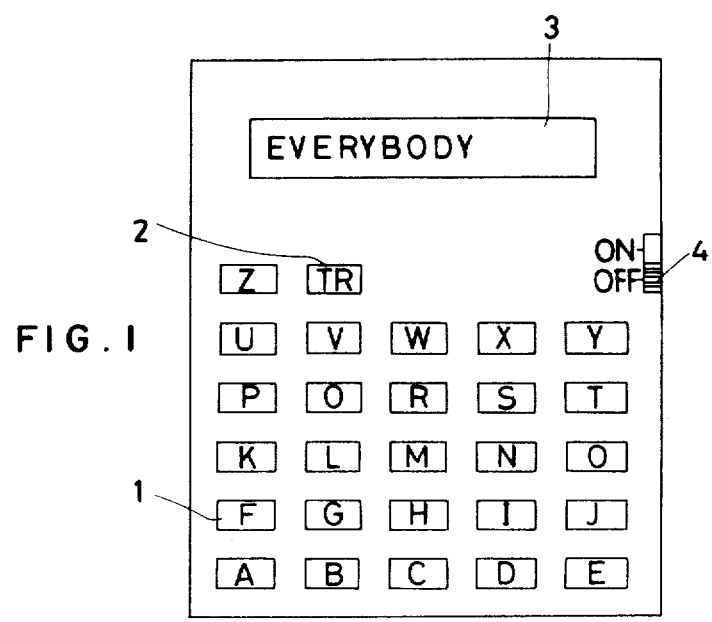
FIG. 1 shows a plan view of an electronic translator embodying the present invention.
FIG. 3 shows a part of the contents of a memory provided in the circuit of FIG. 2.

Referring now to FIG. 1, there is illustrated an electronic translator of the present invention comprising 26 alphabetical key switches 1, a Japanese translation key 2, a display 3, and a power switch 4. Each of the 26 alphabetical key switches 1 is actuated to enter an alphabetical letter within a particular English word. The Japanese translation key 2 is actuated to obtain a Japanese word or phrase equivalent to the particular English word. While one of the key switches 1 is operated, the display 3 shows letters of the particular English word being entered. As soon as the translation key 2 is operated, the display 3 shows the Japanese word or words retrieved.

Figures 2, 4, 5:
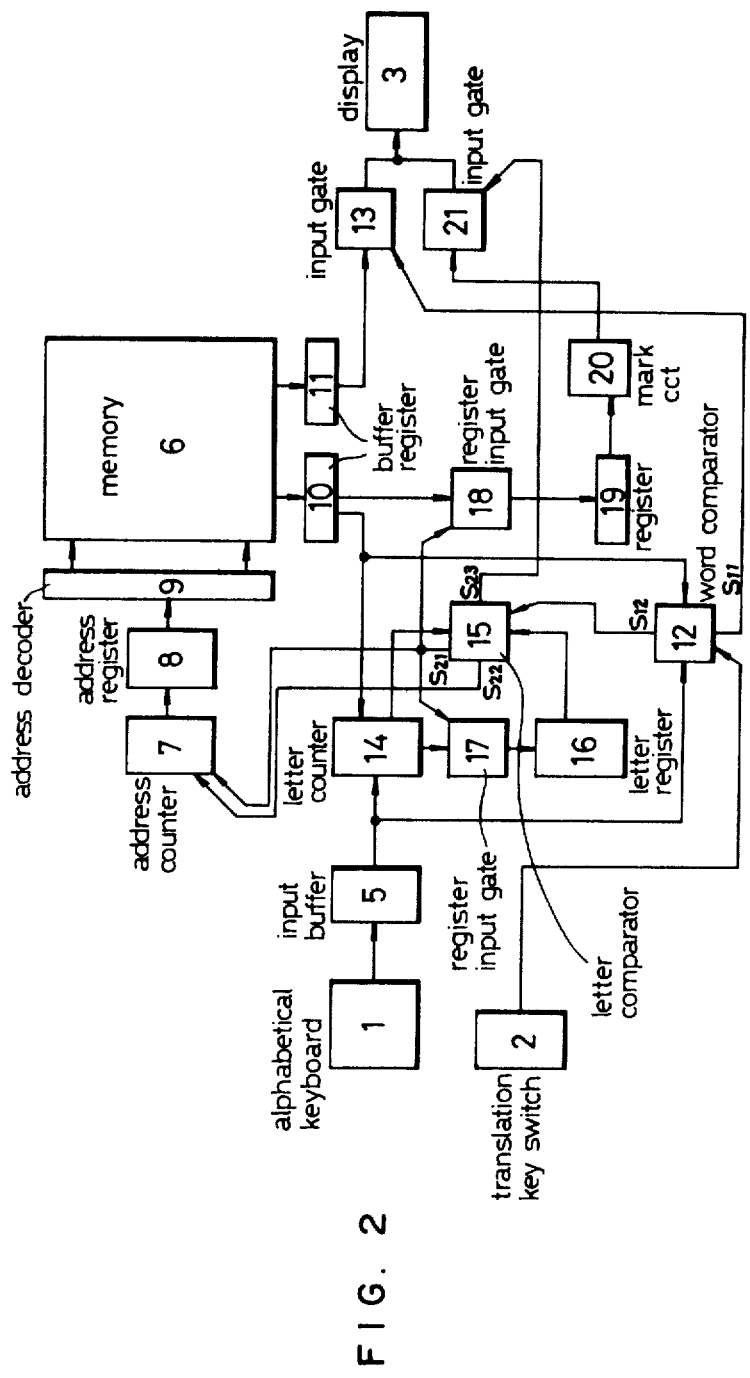
FIG. 2 shows a block diagram of a circuit incorporated within the electronic translator of FIG. 1.
FIGS. 4 and 5 show display conditions controlled by the circuit of FIG. 2.

FIG. 2 shows a block diagram of a circuit incorporated within the electronic translator of FIG. 1. The circuit comprises an alphabetical keyboard 1 equivalent to the 26 alphabetical key switches 1 of FIG. 1, a translation key switch 2 related to the Japanese translation key 2 of FIG. 1, the display 3, an input buffer 5, a memory 6, an address counter 7, an address register 8, an address decoder 9, buffer registers 10 and 11, a word comparator 12, input gates 13 and 21, a letter counter 14, a letter comparator 15, a letter register 16, register input gates 17 and 18, a register 19 and a mark circuit 20.

The memory 6 stores a plurality of pairs of English words and their corresponding Japanese words and phrases. They are stored in alphabetical order as shown in FIG. 3. The buffer register 10 receives and contains English words developed by the memory 6. The other buffer register 11 receives and contains Japanese words or phrases, and parts of speech developed by the memory 6 which correspond to English words presently contained within the buffer register 10. The letter comparator 12 determines whether the English word entered by the keyboard 1 is equivalent to the English word developed by the memory 6. It generates signals S11 when the both English words are equivalent. The signals S11 enter the input gate 13 to make it conductive.

The input gate 13 passes the contents of the buffer register 11 toward the display 3. Hence, a Japanese word or phrase, and a part of speech contained within the buffer register 11 are sent to the display 3. They correspond to the English word within the buffer register 10, namely, that entered by the alphabetical keyboard 1.

The letter counter 14 is provided for counting the number of letters of the word contained within the English word stored within the input buffer 5 which match with the letters of the English word stored within the buffer register 10. The letters are matched beginning from the head of the English word. The word comparator 12 provides signals $S_{12}$ when the words stored in the buffer register 10 and the input buffer 5 are not the same. The $S_{12}$ signals are applied to the letter comparator 15. The letter comparator 15 is operated so that is compares the contents "A" of the letter counter 14 and the contents "B" of the letter register 16. The letter register 16 is connected to the letter counter 14 through the register input gate 17. The register 16 is placed in reset condition when the retrieval operation commences.

When $A > B$, the letter comparator 15 generates signals $S_{21}$ to make the register input gate 17 conductive so that the contents "A" of the counter 14 are transferred to the register 16. The register input gate 18 is made conductive in response to the admission of the $S_{21}$ signals. The contents of the buffer register 10 are transferred to the register 19. The $S_{21}$ signals are introduced to the address counter 7.

When $A = B$, the letter comparator 15 generates signals $S_{22}$ entering the address counter 7. The address counter 7 is responsive to the admission of the $S_{21}$ signals or the $S_{22}$ signals for causing the address register 8 to increase its address. Next words will be addressed and developed.

When $A < B$, the letter comparator 15 develops signals $S_{23}$ entering the input gate 21, so that the gate 21 is made conductive. The mark circuit 20 is provided for adding a particular symbol such as the question mark "?" to the English word contained within the register 19 and for sending the results to the input gate 21. When conductive, the input gate 21 passes the results from the mark circuit 20 toward the display 3. The display 3 shows the English word with the question mark "?".

Assuming now that a wrong word "EVERYBADY" is entered with the object to enter the word "EVERYBODY", operation of the circuit will be described.

FIG. 4 shows a display condition in the case where the word "EVERYBADY" has already been introduced. Actuation of the translation key switch 2 follows to commence the retrieval operation. The address counter causes the address register 8 to contain an initial address with the help of the word comparator 12 and the letter comparator 15. The memory 6 sequentially provides a plurality of English words for comparison purposes.

After letters "EVER" are detected to be agreed with, the register 19 and the letter register 16 contains "EVER" and "4," respectively. Comparison between the word "EVERYBADY" and the word "EVERY" stored in the memory 6 is performed. Since they are not equivalent, the word comparator 12 generates the $S_{12}$ signals. The letter comparator 15 is operated so that the contents "A" of the letter counter 14 are comparated with those "B" of the letter register 16. In this case, "A" is "5" and "B" is "4." Since $A > B$, the $S_{21}$ signals are developed. In response to the $S_{21}$ signals, the register input gates 17 and 18 are made conductive. The contents of the buffer register 10 and the letter counter 14 are respectively transported to the register 19 and the letter register 16. Hence, the register 19 and the letter register 16 contains "EVERY" and "5," respectively.

Since the address of the address register 8 is advanced in response to the $S_{21}$ signals, the memory 6 generates a next English word, say, "EVERYBODY" and its part of speech "PRON.," and its corresponding Japanese translated word. They are contained within the buffer registers 10 and 11. Comparison operation is reconducted. After this comparison operation has been completed, the register 19 and the letter register 16 contain "EVERYBODY" and "6," respectively.

A next word, say, "EVERYONE" is then subjected to the comparison operation. The word comparator 12 generates the $S_{12}$ signals to operate the letter comparator 15. In this case, since $A < B$, the $S_{23}$ signals are developed to make the input gate 21 conductive. While the word "EVERYBODY" stored in the register 19 is transported to the display 3, the question mark is added to the ending of the word with the help of the mark circuit 20. The display 3 shows them as shown in FIG. 5. The generation of the $S_{23}$ signals means the termination of the retrieval operation.

Thus, the above-described preferred embodiment of the present invention facilitates the entrance of words by means of the key input means whereby it is unnecessary for the user to be certain whether the words being entered are correct.

Attention is directed to another preferred form of the present invention. An purpose of this preferred form of the present invention is to facilitate the entrance of words containing Arabic numerals. In particular, Japanese words having Arabic numerals can be usually pronounced in different ways. The operator cannot always be sure which pronunciation is correct for key input purpose. This problem can be eliminated by enabling the key input using each of Arabic numerals, rather than its Japanese pronunciation. This problem may be present in other languages.

Figure 6:
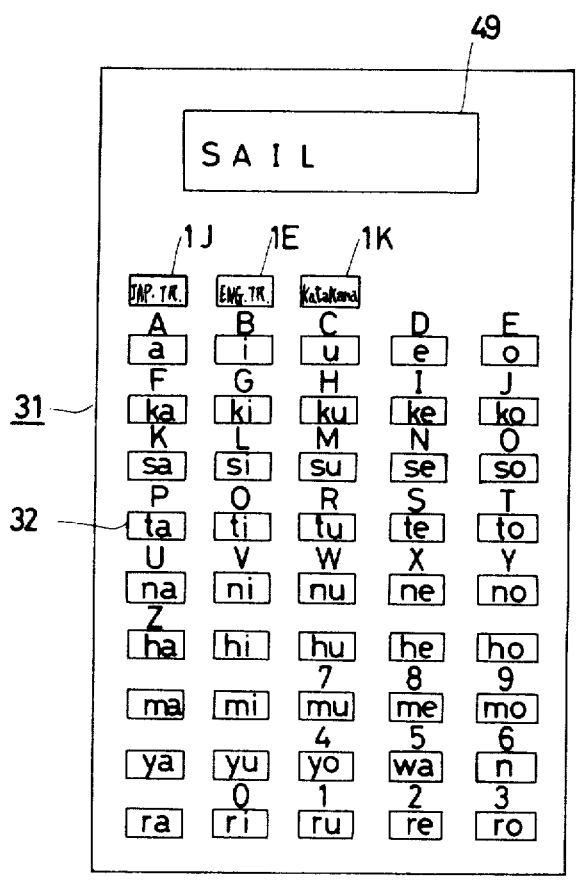
FIG. 6 shows a plan view of another type of electronic translator according to the present invention.

Referring now to FIG. 6, there is illustrated another type of electronic translator according to another preferred form of the present invention. This type of electronic translator comprises a key input device 31 containing Arabic numeral keys "0" to "9" and English and Japanese alphabetical key switches 32, a Japanese translation key 1J, an English translation key 1E, a Japanese "katakana" key 1K, and a display 49. Once the "Katakana" key 1K is operated, the alphabetical key switches 32 provide Japanese "Katakana" letters. They key 1K is further operated so that the keys 32 provide English alphabets. Each of the keys 1E and 1J is operated to conduct English and Japanese translation, respectively.

The English alphabetical key switches are aligned in alphabetical order. Each of the key switches is labeled by respective symbols specifying the function. All of the Japanese syllabary key switches are labeled by the Roman alphabets. Besides the Roman alphabets, the Japanese "katakana" letters may be provided.

FIGS. 7 and 8 are parts of the contents of a memory 41 which is described below.

As can been seen from FIG. 7, there are stored a plurality of Japanese words containing the Japanese syllabary words and digits from 0 to 9 in order. That is, rather than the Japanese alphabetical order of 50, a 60-order is adopted. Characters "a1," "a2" . . . "am" positioned in front of words represent address codes indicating addresses at which each of the English words corresponding to each of the Japanese words is stored. An English word, say "once," corresponds to the Japanese word related to the character "a1." The address code "a1" indicates an address in which the English word "once" is stored.

With reference to FIG. 8, there are stored a plurality of English words from "able" to "zoom" in alphabetical order. Characters "b1," "b2," . . . "bn" are address codes representing addresses at which each of the Japanese words corresponding to each of the English words is stored.

FIG. 9 shows a retrieval table provided with respect to the memory 41. The head address for retrieval purpose is defined by the head letter of each of many words entered. Beside each of the head addresses, the head letter of the word is present. As can be seen from FIG. 9, when the head letter of each of words, say, "1" is entered, the head address to be addressed is "01100100," with respect to many words starting with "1."

FIG. 10 shows a block diagram of a circuit implemented within the translator of FIG. 6. The circuit comprises a Japanese translation key 31 J, an English translation key 31E, a "Katakana" key 31K, alphabetical keys 32 each of which corresponds to 1J, 1E, 1K and 32 of FIG. 6, an encoder 33, an input buffer 34, a detection circuit 35, an English table circuit 36, a Japanese table circuit 37, an address counter 38, an address register 39, an address decoder 40, the memory 41, an output circuit 42, an output buffer 43, an address code buffer 44, a gate 45, a translation output gate 46, a delay circuit 47, a driver 48, and the display 49.

The English table circuit 36 and the Japanese table circuit 37 store the contents as described in FIG. 9.

Operation of the circuit will be described with the assumption that the keys 32 are actuated to enter a Japanese word "     " equivalent to an English word "once." The encoder 33 is operated to code the word. The buffer 34 receives coded information. Actuation of the key 31E follows so that the memory 41 is addressed to find out a Japanese word equivalent to the entered Japanese word. The head letter of the entered word, namely, "1" activates the circuit 37 so that it provides the head address to the register 39. Responsive to the head address, the decoder 40 addresses the memory 41. The memory 41 transmits a Japanese word starting with "1" to the buffer 43 through the circuit 42.

The memory 41 transmits an address code to the buffer 44 through the circuit 42. This address code represents an address in which an English word corresponding to the Japanese word developed is stored.

The detection circuit 35 compares the contents of the buffer 34 and those of the buffer 43. When they are not equivalent, the circuit 35 provides $S_1$ signals. The $S_1$ signals are applied to the counter 38 so that the address of the counter 38 is increased to enable the development of a next word from the memory 41. The buffer 43 receives the next word from the memory 41. These operations are repeated until the circuit 35 detects the equivalency between the contents of the buffers 34 and 43. When they are equivalent, the circuit 35 provides $S_2$ signals entering the gate 45. Hence, the gate 45 transfers the address code from the buffer 44 to the register 39.

An English word sought to be obtained is applied to the buffer 43. The memory 41 provides an English word "once" equivalent to the Japanese word entered. The $S_2$ signals from the circuit 35 are applied to the delay circuit 47. Output signals from the circuit 47 are admitted to the gate 46. The delay time controlled by the circuit 47 is equal to the period where, after an address code is developed by the buffer 44, an English word related to the address code is transmitted from the memory 41 to the buffer 43. The English word contained within the buffer 43 is transferred to the driver 48 through the gate 46. Hence, the display 49 shows the English word "once."

A translation from an English word to a Japanese word is performed as follows: The keys 32 are actuated to enter an English word, e.g., "once." Operations of the key 31J follows. Responsive to the head letter, "o" of the entered word, the circuit 36 provides the head address pertinent to the head letter "o" to the register 39. Operations similar to those in a translation from Japanese to English as described above are carried out. Finally, a Japanese word equivalent to "once" is applied from the memory 41 to the buffer 43. The display 49 points out the Japanese word.

While the certain embodiments of the present invention have been described, it will be apparent to those skilled in the art that various changes and modifications may be made therein without departing from the spirit and scope of the invention as claimed.

What is claimed is:

1. An electronic language interpreter device wherein a first word represented in a first language is entered to obtain a translated word in a second language equivalent to the first word, comprising:
   input means for entering the first word;
   memory means for storing a plurality of second words in the first language;
   access means responsive to the first word entered by said input means for addressing said memory means for retrieving the second words;

similarity detection means responsive to said access means for detecting similarity between letters of the first word and letters of the second words;

means responsive to said similarity detection means for displaying a translated word corresponding to a determined one of the second words when the determined second word is the same as the first word; and means responsive to said similarity detection means for displaying a selected one of the second words which is most similar to the first word when none of the second words are the same as the first word.

2. The device of claim 1, further comprising means for displaying a particular symbol with said selected second word which is most similar to the first word.

3. The device of claim 1, wherein said similarity detection means comprises means for counting the number of letters of the second words which are detected to be equivalent to letters of the first word, and control means responsive to said counting means for advancing the address in said memory means addressed by said access means whereby a next second word is retrieved from said memory means when no previously retrieved second word is found to be the same as the first word and for enabling display of the second word most similar to the first word when no second word in said memory means is the same as the first word.

4. The device of claim 1, wherein said memory means stores indicators of parts of speech associated with each of the second words.

5. An electronic language interpreter device wherein a first word represented in a first language is entered to obtain a translated word represented in a second language equivalent to the first word, comprising:

input means for entering the first word;

memory means provided for storing a plurality of second words in the first language;

access means responsive to the first word entered by said input means for addressing said memory means for retrieving the second words;

means for determining if any second word is the same as the first word;

means for displaying a translated word equivalent to a second word determined to be the same as the first word;

said input means comprising at least one Arabic numeral key for entering a first word containing at least one Arabic numeral;

said memory means storing a plurality of second words having the at least one Arabic numeral at particular addresses; and said access means being responsive to said entered Arabic numeral for addressing said memory means at said particular addresses.

6. The device of claim 5, further comprising circuit means connected to said access means for controlling said access means to address said memory means in response to said at least one Arabic numeral.

* * * * *